US007730015B1

(12) United States Patent
Wahlig et al.

(10) Patent No.: US 7,730,015 B1
(45) Date of Patent: Jun. 1, 2010

(54) STACKABLE STORAGE ACCESS MECHANISM FOR FILE SYSTEMS

(75) Inventors: James G. Wahlig, Austin, TX (US); Steve Mcpolin, Nepean (CA); Richard S. Brown, Frankfort, IL (US)

(73) Assignee: Oracle America, Inc., Redwood Shores, CA (US)

( * ) Notice: Subject to any disclaimer, the term of this patent is extended or adjusted under 35 U.S.C. 154(b) by 1282 days.

(21) Appl. No.: 10/966,427

(22) Filed: Oct. 15, 2004

(51) Int. Cl.
G06F 17/30 (2006.01)
(52) U.S. Cl. .................................. 707/102; 707/100
(58) Field of Classification Search ........................ None
See application file for complete search history.

(56) References Cited

U.S. PATENT DOCUMENTS 5,561,799 A * 10/1996 Khalidi et al. .............. 707/200

2002/0077842 A1 * 6/2002 Charisius et al. ............... 705/1
2006/0015838 A1 * 1/2006 Wang et al. .................. 717/100

* cited by examiner

*Primary Examiner*—Baoquoc N To
(74) *Attorney, Agent, or Firm*—Osha • Liang LLP

(57) ABSTRACT

A computer system, including a memory a file system for managing files, a file system virtual memory interface for providing an interface between said memory and said file system, comprising a primary abstraction component and three sub-components supporting said primary abstraction component in said file system, wherein said primary abstraction component abstracts said memory for said file system, and a file system stackable storage access mechanism (SSAM) layer for providing an interface between said file system and a device, wherein said SSAM layer has first SSAM abstraction component and a second SSAM abstraction component and wherein said SSAM layer abstracts said device for said file systems.

23 Claims, 12 Drawing Sheets

STACKABLE STORAGE ACCESS MECHANISM FOR FILE SYSTEMS

BACKGROUND

Computer systems can be generally divided into four components: the hardware level, the application programs, the operating system, and the user level. The hardware level provides the basic computing resources and includes a central processing unit (CPU), memory, and input/output (I/O) devices. The application programs, such as database systems and business programs, define the ways in which these resources are used to solve the computing problems of users. The operating system (OS) controls and coordinates the use of the hardware among the various application programs for the various users. In doing so, one goal of the OS is to make the computer system convenient to use. A secondary goal is to use the hardware in an efficient manner.

The Unix operating system is one example of an OS that is currently used by many enterprise computer systems. Solaris™ (commercially available by Sun Microsystems, Inc., a corporation in Santa Clara, Calif.) is a multitasking, multiprocessing OS providing an enterprise-wide Unix environment. Unix was designed to be a simple time-sharing system, with a hierarchical file system, which supported multiple processes. A process is the execution of a program and may include a pattern of bytes that the CPU interprets as machine instructions (text), data, and a stack. A stack defines a set of hardware registers or a reserved amount of main memory that is used for arithmetic calculations.

Unix includes two separable parts: the system programs and the kernel. Systems programs may include system libraries, compilers, interpreters, shells, and other such programs, which provide useful functions to the user. The kernel is the central controlling program that provides basic system facilities. The kernel creates and manages processes, provides functions to access file-systems, and supplies communications facilities. The kernel is the only part of Unix that a user cannot replace. The kernel also provides the file system, CPU scheduling, memory management, and other operating-system functions by responding to "system-calls." Conceptually, the kernel is situated between the hardware and the user level. System calls are the means for the programmer to communicate with the kernel.

FIG. 1 shows a block diagram of a conventional computer system (100) having a CPU (110), file system (120), memory (160), system controller (150), and applications (170), intercoupled by a bus (101). Further, the file system (120) reads and writes to a block storage device (199) (e.g., a disc) and an Input/Output (I/O) device (130) via one or more device drivers (195).

The prior art system (100) shown in FIG. 1 employs a distributed memory mapping scheme in which physical memory and I/O of the computer system (100) is mapped with hardware descriptors. The computer system (100) implements a shared resource environment which allows such system resources as memory (160) and file system (120) to be shared between applications processes in applications (170). The application processes are able to access virtual memory in memory (160) sometimes with the use of a memory controller (140). The multiple and varied applications (170) often attempt simultaneous access the file-system (120) in the shared environment of the computer system (100).

As distributed systems become prevalent, CPU (or processor) speed, network speed, Random Access Memory (RAM) size, and storage disk size increase along with access to these devices. The interface between the file system (120) and memory (160) therefore becomes important.

Memory requirements of the computer system (100) frequently cannot be met with a single memory device. Often, several memory devices are interconnected to form a memory system. In a memory system, capacity is expanded by increasing the number of words (i.e., multiplexing outputs from two or more memory devices) or by increasing the word length (i.e., placing the outputs of two or more memory devices in parallel) above an attainable single memory device. A memory system with an increased number of words requires address expansion; the memory system requires expanding the number of address bits to which the memory system responds. The number of address bits that a microprocessor provides dictates its memory address space or the range of memory locations it can directly address. Depending upon the size of the memory system, external address decoding logic, in addition to the memory's inputs may also be required for address expansion.

RAM is typically the main memory in many computer systems. When an application (170) initially executes, the application (170) is loaded into RAM, generally from the block storage (199) and the operating system then directs the application (170) to begin execution. Program data also loads into the computer's RAM. As changes are made in the data, the contents of the RAM are altered, and when the user finishes with the application, the revised data is copied back to the block storage (199).

Read Only Memory (ROM) is the part of memory where the basic input/output system (BIOS) of the computer typically resides. The BIOS is the interface between the computer hardware and the operating system and applications software. Under normal circumstances, one cannot write to ROM. The computer system (100) includes several memory types (e.g., RAM, ROM, etc.) that access different locations in the memory (160). And in order to have a cohesive memory access to the various applications (170) that execute in the computer system (100), the memory (160) in the computer system (100) typically has a number of memory descriptors, as described in FIG. 2.

FIG. 2 shows a block diagram of a memory descriptor scheme of a distributed computer system. A computer system has unique specific memory descriptors (or page table entries) (214, 215, 216) associated with each instance of an application (170) that access a different type of memory (e.g., Memory 1 (220), Memory 2 (221), Memory 3 (223)). The memory descriptors (214, 215, 216) that define relationships between the applications (170) and main memory identifying specific address ranges (i.e., memory segments (210, 211, 212)) for specific purposes.

Many modern computer systems perform a variety of functions using peripheral devices including block devices, such as disc drives. For the computer's OS to utilize peripheral devices, the OS and the peripheral devices are effectively linked. Peripheral devices and the OS are typically linked by device drivers, which are accessed by the file system using a strategy routine. Device drivers receive I/O commands from file systems associated with the OS. To send such I/O commands to the device drivers, a file system typically reads into or writes out of memory. Thus, with the conventional multiplicity of memory descriptors discussed above, file systems are required to manipulate multiple representations of RAM in order to initiate I/O commands to device drivers.

Conventionally, the memory that a file system needs to read into or write out of takes the form of a buffer or array of buffers (e.g., in kernel or user address space), a page, or a page list. Some forms of direction, such as flags, are used to read a file into or write a file from a user buffer or other memory structure. A buffer read/write ("bread/bwrite") routine can be used to read/write a file from/into a kernel buffer. Similarly, memory page I/O ("pageio") can be used with pages and page lists, and a user I/O ("uio") routine with user buffers. Thus, the file system is required to procure and act on a sizable amount of information regarding the memory to accomplish interactions therewith.

If memory is changed in some way, such as by abstracting or by enlarging the specified page size (for instance, changing from an 8 KByte to a 64 KByte page size), the file system may have corresponding problems. Where memory is abstracted, accessory functions would have to be added, which increases complexity. A routine can conventionally handle memory abstractions by decomposing the abstraction for the file system to access pieces to construct buffer headers to go to a strategy routine. However, this adds complexity, adds task requirements to the file system, and may be slow and inefficient, requiring inordinately intricate code. Alternatively, all device drivers in use with a computer deploying memory abstraction would have to be modified to accept the selected abstraction.

SUMMARY

In general, in one aspect the invention relates to a computer system, comprising a memory, a file system for managing files, a file system virtual memory interface for providing an interface between said memory and said file system, comprising a primary abstraction component and three sub-components supporting said primary abstraction component in said file system, wherein said primary abstraction component abstracts said memory for said file system, and a file system stackable storage access mechanism (SSAM) layer for providing an interface between said file system and a device, wherein said SSAM layer has first SSAM abstraction component and a second SSAM abstraction component and wherein said SSAM layer abstracts said device for said file system.

In general, in one aspect the invention relates to a computer comprising a file system and a file system virtual memory interface system having a primary abstraction component, a file system stackable storage access mechanism (SSAM) layer for providing an interface between said file system and a device to allow said file system to control said device, comprising a first SSAM abstraction component, and a second SSAM abstraction component; wherein said first and said second SSAM abstraction components allow said SSAM layer to abstract said device for said file system.

In general, in one aspect the invention relates to a computer system comprising a file system, a file system virtual memory interface system having a memory descriptor, a file system stackable storage access mechanism (SSAM) for providing an interface layer between said file system and a device to allow said file system to control said device, a method for performing an input/output (I/O) routine on said device comprising accessing said primary abstraction component, said first SSAM abstraction component, and said second SSAM abstraction component, wherein said SSAM layer has a SSAM abstraction component and an opaque cookie, ascertaining a parameter corresponding to said I/O routine from said first SSAM abstraction component, and said second SSAM abstraction component, initiating said I/O routine according to said parameter, and returning data corresponding to said I/O routine.

Other aspects of the invention will be apparent from the following description and the appended claims.

DETAILED DESCRIPTION

Figure 1:
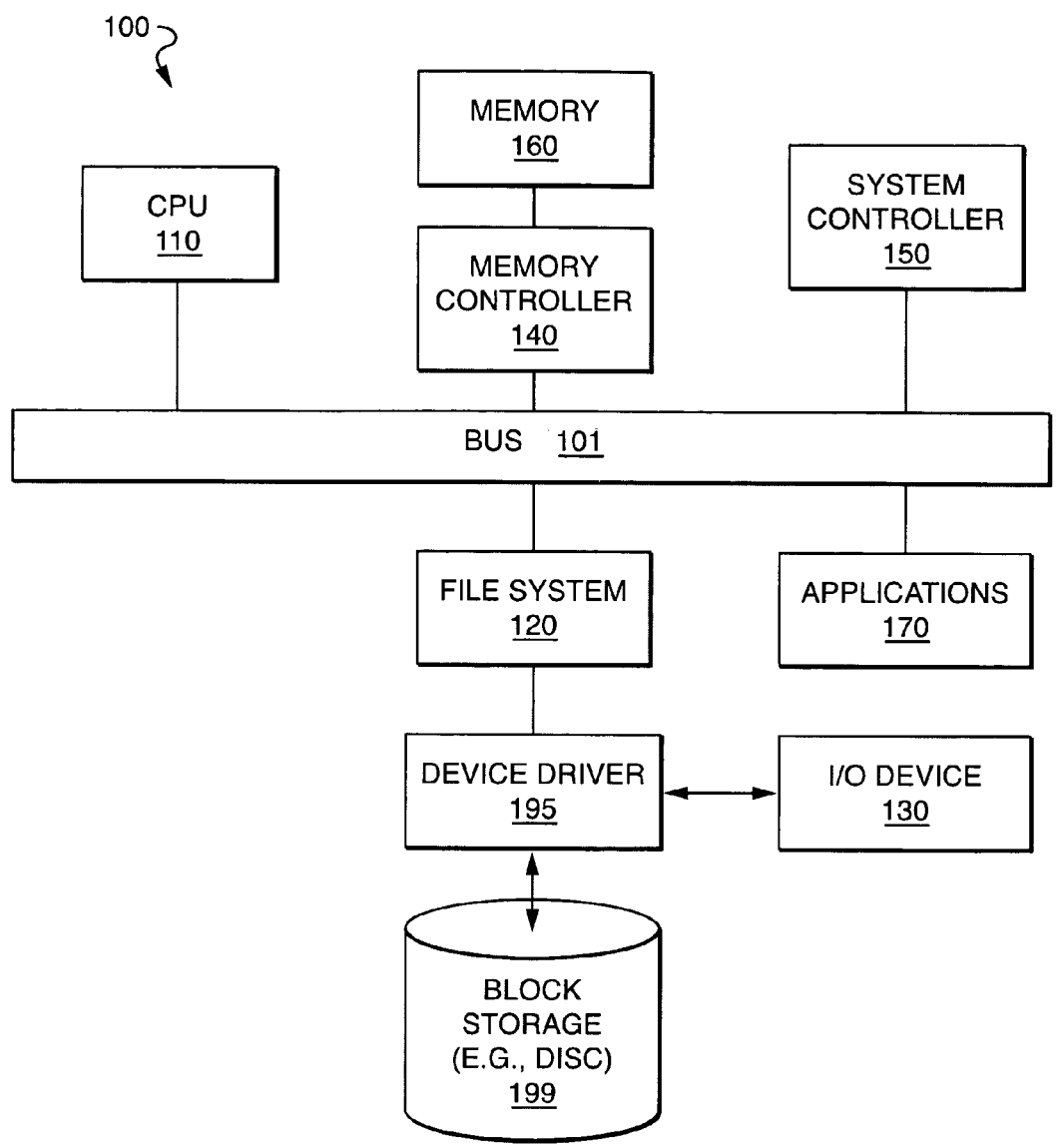
FIG. 1 shows a block diagram of a computer system.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

The embodiments of the invention are directed to a system, an architecture, and method for providing a stackable storage access mechanism (SSAM) for file systems for abstracting memory and devices away from file systems to improve operation of the file system. In one embodiment of the invention, a memory descriptor generation system generates a memory descriptor that manages a one or more memory objects without having each of such objects independently generating a plurality of memory descriptors for each instantiation of applications that execute in the computer system. This memory descriptor obviates the need for the file system to be aware of detailed information about the memory and thus improves the efficiency of the file system.

In one embodiment of the present invention, a SSAM provides an interface layer between the file system and a block storage device (such as a disc) using abstractions of memory, as well as abstractions of the device itself. The SSAM layer allows the file system to abstract properties of device drivers, improving efficiency by removing the need for the file system to "know" about properties (such as block size) of the devices.

These memory and device abstractions economize the memory-dependent and device driver-dependent functions of the file system.

Figure 3:
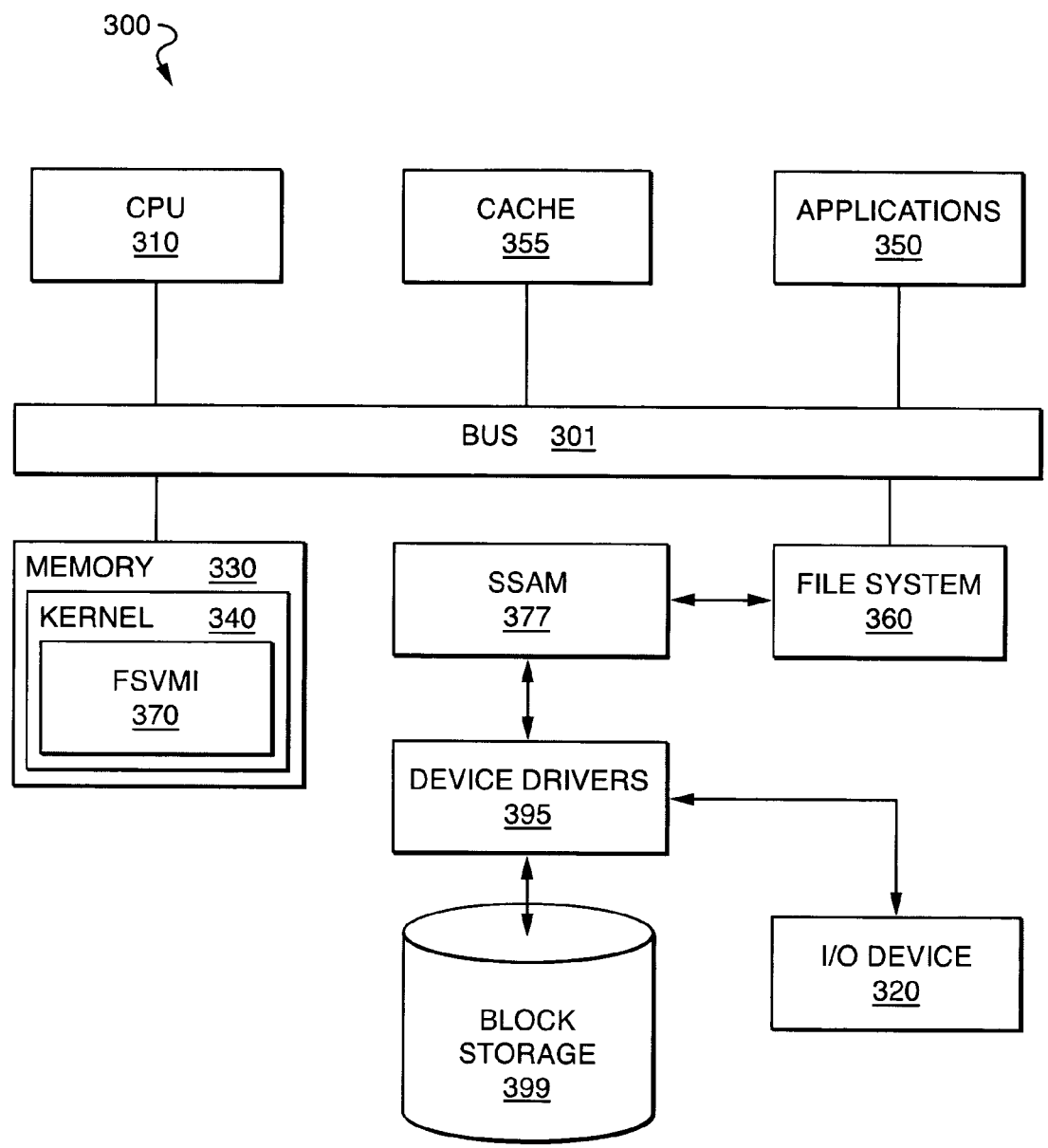
FIG. 3 shows a block diagram of a computer system in accordance with an embodiment of the invention.

FIG. 3 is a block diagram of one embodiment of a computer system (300) of the present invention. In one embodiment of the invention, the computer system (300) is connected to an external block storage device (399) and to an external I/O device (320) through which applications (350) according to the present invention can be loaded into computer system (300). External block storage device (380) and external I/O device (320) are connected to the computer system (300) through respective device drivers (395). In the present embodiment, a SSAM layer (377) interconnects these device drivers (395) with file system (360) of computer system (300). I/O device (320) may be a computer program product reader, such as a floppy disk drive, an optical scanner, a CD-ROM device, etc. Block storage device (399) may be any kind of block storage device, for instance, disc storage media. Computer system (300) further includes main memory (330), CPU (or processor) (310), file system (360), applications (350), cache (355) and descriptor generation system (also known as the file system virtual memory descriptor generation interface (FSVMI)) (370), interconnected through a bus (301).

FIG. 3 additionally shows memory (330) including a kernel level memory (340). In one embodiment of the invention, memory (330) may be virtual memory, which is mapped onto physical memory including RAM or a hard drive, for example, without limitation. During process execution, a programmer programs data structures in the memory (330) at the kernel level memory (340). According to the present invention, the FSVMI (370) generates memory descriptors to represent corresponding applications having a plurality of instantiations.

The memory descriptor generated provides a single mechanism of representing memory objects and provides a common interface to operations upon those objects. In one embodiment of the present invention, two types of memory descriptors may be generated: (1) a basic descriptor that manages memory objects; and (2) derived descriptors that manage other memory descriptors. In one embodiment of the present invention, only one level of derivation is supported and subsequent derivations are constructed relative to the underlying basic descriptor.

Each memory object in memory (330) has two primary components, namely the underlying memory itself and its mapping structures. The memory descriptor grants access to the underlying memory by providing a pointer to some sub-range of the object. In one embodiment of the present invention, the memory descriptor has a collection of attributes that guide the memory descriptor's behavior. These attributes are associated with a pool from which the memory descriptor is allocated. In one embodiment of the present invention, each memory descriptor logically includes type information, data, an offset, length information, a reference information, and the pool from which the descriptor is allocated.

Figure 4:
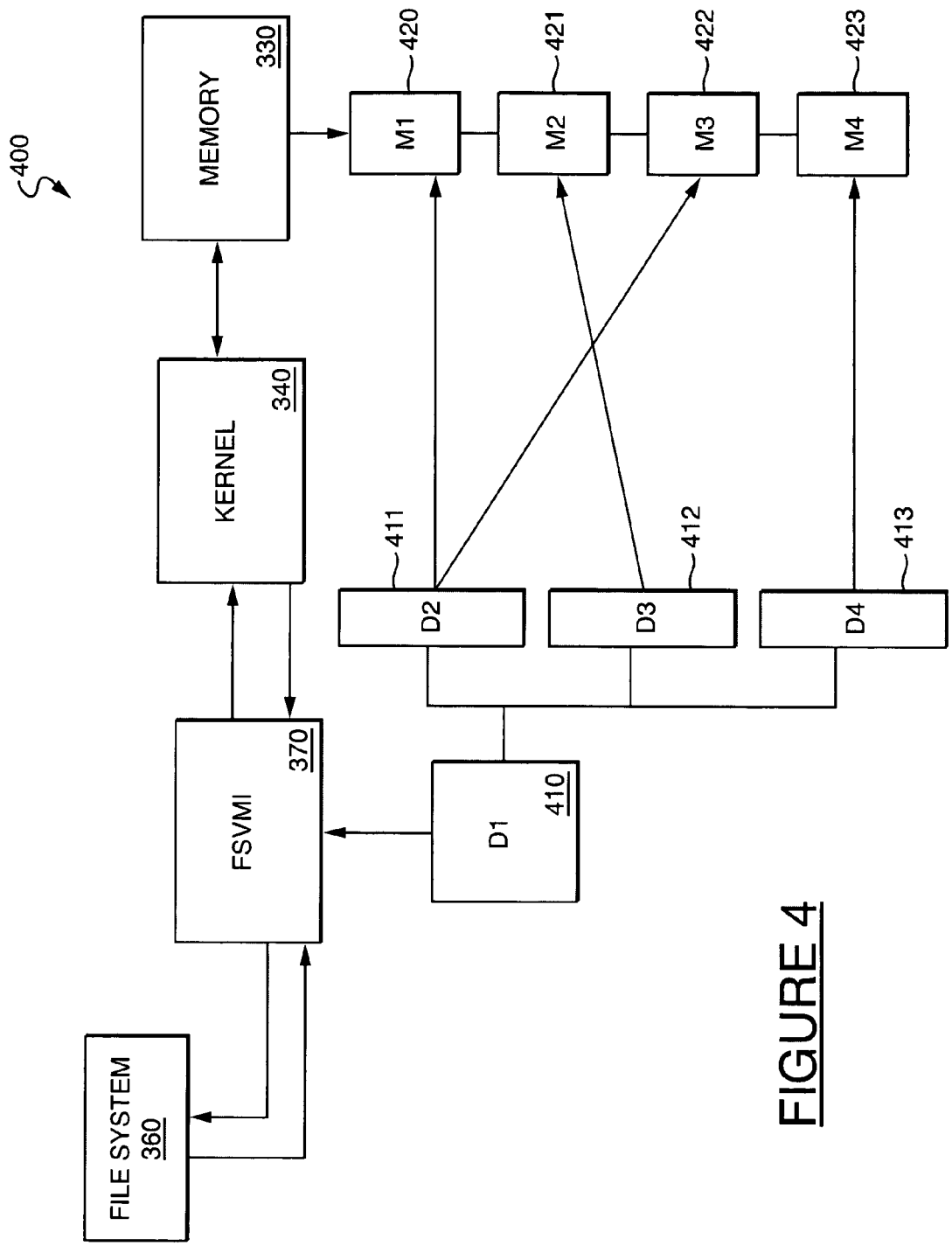
FIG. 4 shows a block diagram of a virtual memory file-system memory descriptor generation interface in accordance with an embodiment of the invention.

FIG. 4 is a block diagram of one embodiment of a memory descriptor generation environment (400) of the present invention. The descriptor generation environment (400), as shown in FIG. 4, includes a file system (360), a FSVMI (370), a kernel (340), and memory (330).

The file system (360) represents a file as an unaligned, directly addressable sequence of bytes. In one embodiment of the present invention, a file is stored in a sequence of fixed sized blocks and a translation which maps (e.g., using file, offset) into a drive, block-number (block#), and byte offset within a block. The device may be implemented as a network of storage devices, which provide secondary mapping of device block# into read-drive, real block# information. This mapping is implemented beneath the device interface to support existing file systems. The means of communicating with this device is primarily a buffer structure (i.e., buf structure).

The buf structure encodes many parameters, including the device identifiers, block number significant to that device, number of bytes to transfer, a set of memory specifications and a description of what to do once the I/O is complete. The buf structure is supported by a set of routines that form the buffer cache. The buffer cache provides synchronous routines to acquire buffers, and a small set of synchronous or asynchronous routines to update the corresponding storage device.

In one embodiment of the present invention, a file base storage mechanism, which provides data transfer between memory descriptor and a storage object, is implemented to map descriptors to corresponding memory ranges. An instance of the storage object is identified by vector of operations and a private data pointer. I/O operations are implemented asynchronously for read and write operations invoking a caller supplied notification when a descriptor generation is complete.

A file base storage mechanism provides a means for the file system (360) to initiate data transfer using memory descriptors. This completes the requirements that the file system (360) only deal with one type of memory object, namely the descriptor. The file base storage mechanism also separates the code of the file system (360) from the device; the file system (360) need only deal with an instance of an abstractor class of the memory descriptor.

Continuing with FIG. 4, the file system (360) interfaces with the kernel (340) via FSVMI (370). The FSVMI (370) is used by files in implementations of the file system (360) to provide an object oriented replacement for memory pages. The interface (370) co-exists with pages and page-based file systems in the operating system's kernel (340). In one embodiment of the present invention, the FSVMI (370) is provided with four sub-components including a primary abstraction component (410) and three sub-components (411, 412, 413) needed to support the primary abstraction component (410). In one embodiment of the present invention, the primary abstraction component (410) is a memory descriptor in memory (330). The memory descriptor provides a common interface to manifold memory objects in memory (330). The three sub-components (411, 412, 413) interact with memory descriptors (M1 (420), M2 (421), M3 (422), M4 (423)). The set of supported objects is complete to the extent that the file system (360) does not deal with any other representation of memory.

In one embodiment of the present invention, support of the memory descriptor requires re-factoring of the existing vnode interface in the kernel (340). For example, the operations that deal with transferring pages or initially mapping do not make sense to a file system (360) that is immune to these concepts. In one embodiment of the present invention, one of the sub-components of the FSVMI (370) provides an implementation of vnode operations that is to be shared by all file systems (360) in the computer system (300). In addition to maintaining the consistency of existing memory descriptors, the sub-components convert the vnode operations (VOPS) into simple uncached operations.

Furthermore, in one embodiment of the present invention, file system (360) transfers data between memory (330) and storage devices (380) in the computer system (300) via a buffer data structure and a set of associated functions. The buf structure exposes various virtual memory data structures and requires fields to be appropriately initialized with them. To immunize the file system (360), an abstract data transfer mechanism may be used. The abstract data transfer mechanism is based on memory descriptors using device independent naming.

Figure 5:
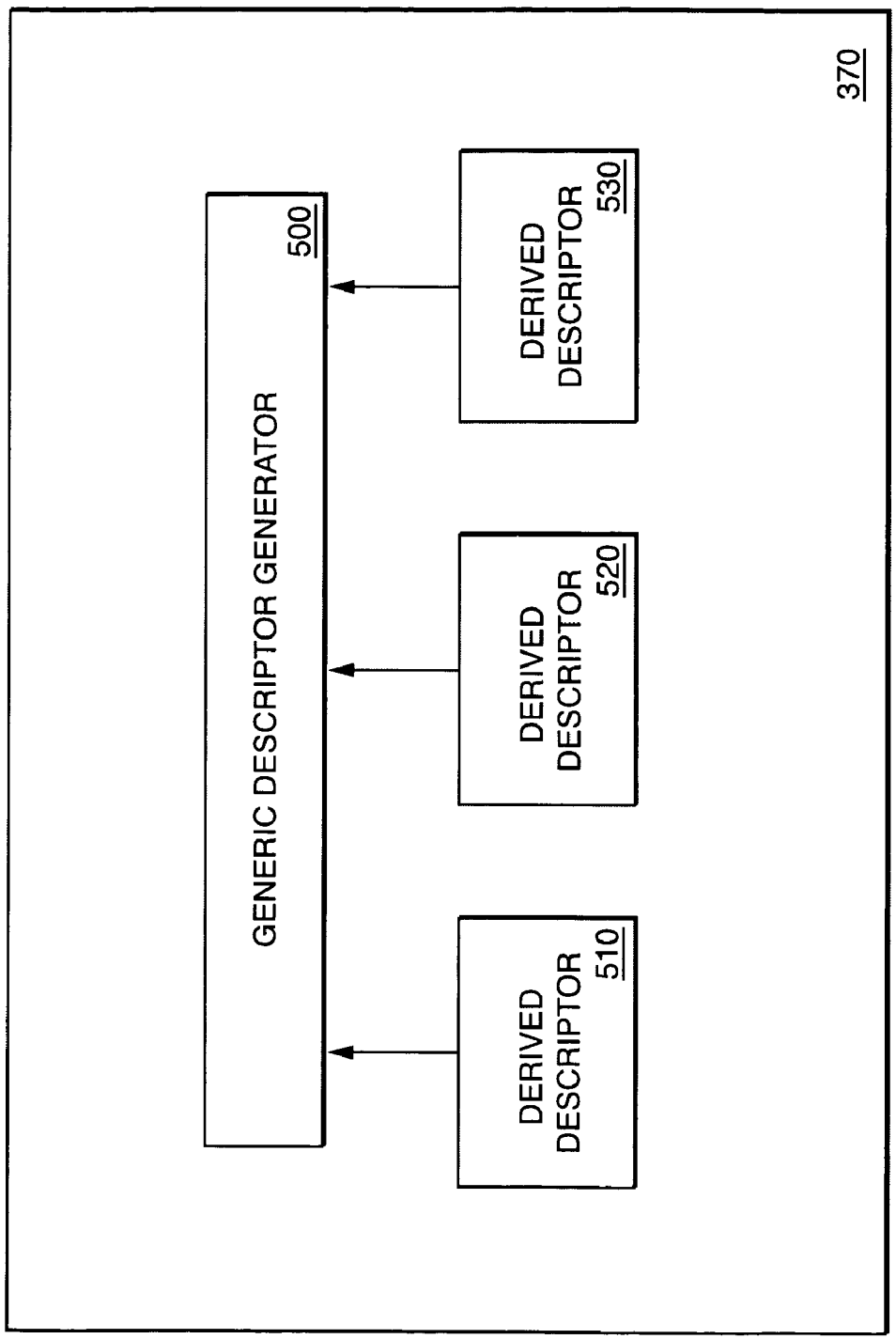
FIG. 5 shows a block diagram of a memory descriptor generation system in accordance with an embodiment of the invention.

FIG. 5 shows a block diagram of one embodiment of the memory descriptor system (370) of the present invention. The memory descriptor system (370) includes a generic descriptor generator (GDG) (500), and derived descriptors (510, 520, 530).

In one embodiment of the present invention, the memory descriptor system (370) manages other memory objects and provides a common interface to operations on these objects. Each memory object has two primary components: (1) the underlying memory itself; and (2) its mapping structure. The memory descriptor system (370) specifies a window into the object it is managing. In one embodiment of the present invention, the window is modifiable. The memory descriptor system (370) grants access to the underlying memory by providing a pointer to a sub-range of the objects. The memory descriptor system (370) has a collection of attributes which provide its behavior. These attributes are associated with a pool from which a plurality of memory descriptors may be allocated.

In one embodiment of the present invention, the memory descriptors generated by the descriptor generation system (370) are pooled. Each memory descriptor is then allocated from this pool. The pool lends lifelong attributes to the descriptors allocated from pool. These attributes may also specify operational behavior of memory descriptors functions. For example, a file system may specify its preferred I/O size to a pool and the memory descriptors may attempt to operate around the size. No more than one pool may exist for a particular file system node; however, the file system nodes may share one pool.

In one embodiment of the present invention, memory descriptors support a number of logical operations that are implemented for the specific underlying objects. In one embodiment, sub-descriptors (510, 520, 530 may be derived from other descriptors. The new descriptors (derived descriptors) are identical to the original, however changes applied to the derived descriptors will not reflect on the original descriptors. Changes applied to the memory that the derived descriptor manages or the mapping are however, reflected in both the derived descriptor and the original descriptor.

In one embodiment of the present invention, the memory managed by a descriptor may be directly accessed using a memory access function that generates a pointer to a sub-range of a provided descriptor. A map operation may return a smaller extent than requested, however the first byte requested must be possible to map or else the map returns an error. An appropriate data lock may be enforced upon the range actually mapped; exclusive for write access and shared for read access. In one embodiment of the present invention, a resize function changes the window length of a descriptor and a seek function may change the base offset into a descriptor. The allowable range of values and the effect of setting these values varies by base descriptor type, etc.

The GDG (500) provides constructive functions to create a memory descriptor. In one embodiment of the present invention, the GDG (500) provides constructors for each underlying type of memory descriptor the CDG (500) generates. For example, a function call "fsivm-mkdesc-iovec" constructs a descriptor that manages a process address space and "uio" structure, which is constructed in a write or read system call. Once the memory descriptor is constructed, the descriptor may be the subject of any of the common memory descriptor functions.

In one embodiment of the present invention, constructors exist for pages, pagelists, uios, kernel and user addresses, buffers, memory descriptors themselves, etc. The descriptor created by GDG (500) manages memory that may be accessed directly using an access function in system (370) that generates a pointer to a sub-range of a particular descriptor. The GDG (500) creates a basic descriptor that includes an allowable range of values whose settings varies by a base descriptor type.

A memory descriptor sub-component logic generates the derived descriptors (510, 520, 530). The derived descriptors (510, 520, 530) are abstractions on several different types of memory representations in the computer system. The derived descriptors derived descriptors (510, 520, 530) are derived from the base descriptor generated by GDG (500). The derived descriptors (510, 520, 530) manage the base descriptor generated by GDG (500).

One skilled in the art will appreciate that the base descriptor may generate only one level of derived descriptors and any levels below the first are generated based on the base. In one embodiment of the present invention, a duplicate function generates a derived descriptor from the original base descriptor. If the original descriptor is derived, the new derived descriptor will be derived from the original direct with a copy of the original's transformations.

Figure 6:
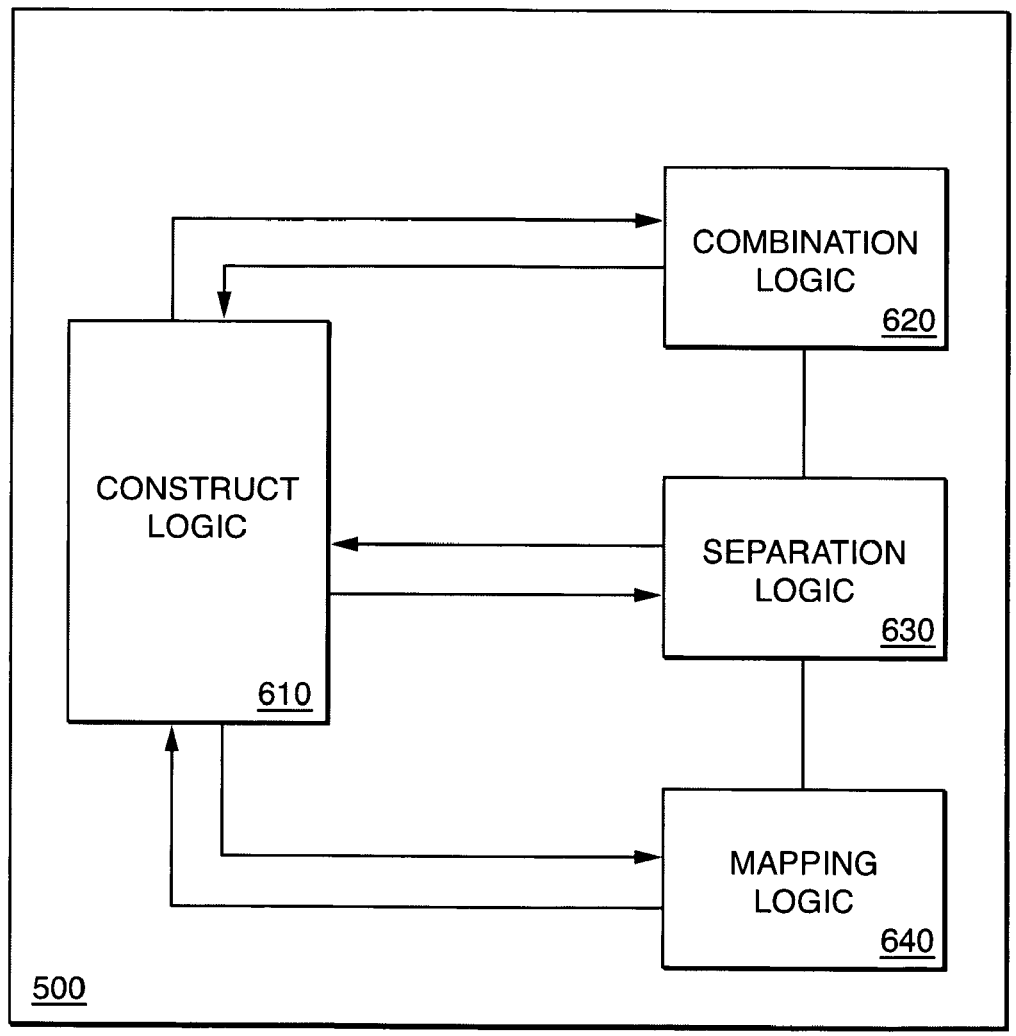
FIG. 6 shows a block diagram of an internal architecture of a descriptor generation logic in accordance with an embodiment of the invention.

FIG. 6 shows a block diagram of one embodiment of the GDG (500) of the present invention. The GDG (500) includes construct logic (610), combination logic (620), separation logic (630), and mapping logic (640).

The construct logic (610) creates a pool of base memory descriptors from which specific descriptors for specific regions in memory are allocated. The pool of descriptors is a central point for common attributes and allocation. In one embodiment of the present invention, the construct logic (610) provides a pool of attribute logic that manipulates and queries attributes of a memory descriptor pool to determine the specific attributes of a specific descriptor. The construct logic (610) constructs memory descriptors for memory objects including pages, page lists, uios, kernel and user addresses, buffers, etc.

In one embodiment of the present invention, the construct logic (610) uses descriptor parameters that include the control structure for related memory descriptors, the minimum number of bytes represented by a descriptor, place to store constructed virtual memory descriptors, and the type of claim to make in memory to generate both base and derivative descriptors.

The construct logic (610) further creates new memory descriptors and allocates mapping information for at least a specified number of bytes for a particular descriptor. In one embodiment of the present invention, the mapping is locked by default and the actual memory may be locked by specifying claims similar to a mapping function in system (370). The construct logic (610) also may construct memory descriptors corresponding to a provided memory page by using parameters, such as the control structure for related memory descriptors, a known page, a place to store a constructed virtual memory descriptor, and the type of claim to make on memory. The page remains resident in memory and valid for the life-span of the descriptor while looking for additional locking guarantees that may be enforced by the memory claim. The descriptor that is constructed will be a direct reference to the identified page.

Combination logic (620) provides a mechanism for concatenating base and addendum information to form a larger memory descriptor. In one embodiment of the present invention, base and addendum information are identical direct types that may be extracted from the same pool and certain types may not be valid (e.g., uio base descriptors). The base descriptors may be enhanced to contain the addendum and the addendum may be transformed into a derivation of the enhanced base.

The separation logic (630) provides a mechanism for resizing descriptors created by the construct logic (610). The separation logic (630) uses parameters, such as the address of a valid memory descriptor, the new size of a proposed descriptor, and an address where the new descriptor will be stored to separate an existing block of descriptors. In one embodiment of the present invention, the separation logic (630) may permit the shrinking or growth of a memory descriptor with certain restrictions. These restriction may be based on the descriptor type. In one embodiment of the present invention, derived descriptors provide results that fit with a corresponding direct descriptor.

The separation logic (630) further allows a descriptor to adjust its base offset from the beginning of the actual memory object using parameters, such as the address of a valid descriptor, the new offset of the descriptor, and the address where to store the previous descriptor. This helps restrict the descriptor functions to a window of a descriptor to simplify interactions with other descriptors.

The mapping logic (640) provides a mapping for a descriptor that is valid for the sub-range defined by the offset and offset length of the actual memory of the system (370). In one embodiment of the present invention, the actual range mapped may be broader than that specified by the descriptor. An application using the descriptor may have to recover the actual range by providing a range parameter specified by system (370). The mapping logic (640) uses descriptor parameters including valid virtual memory description information, an offset from the virtual memory, description for start of a map, and the number of bytes from offset to map the types of lock to maintain upon a designated area in memory. In one embodiment of the present invention, the value of zero for the length is interpreted as the remainder of the descriptor.

Figure 7:
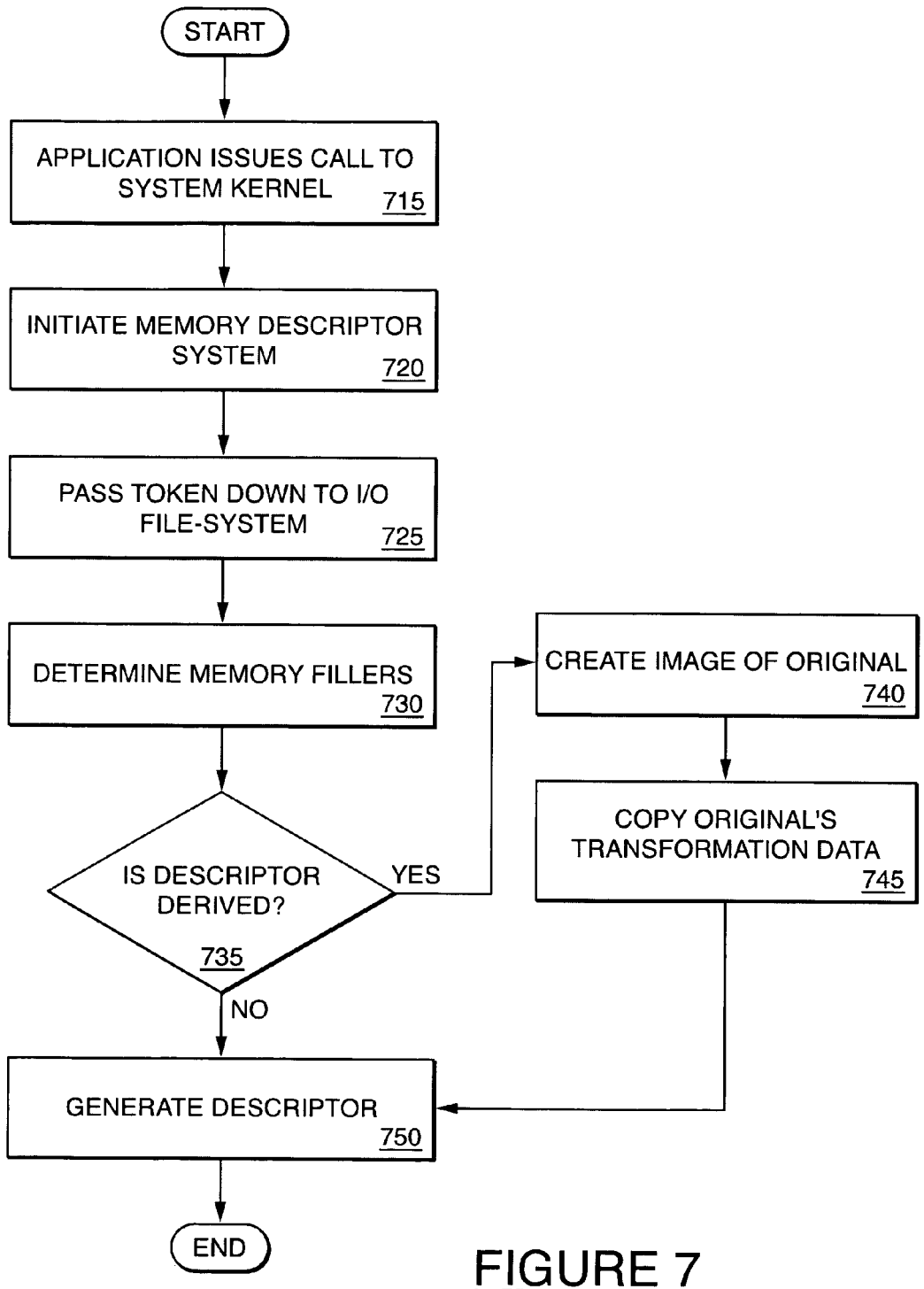
FIG. 7 shows a flow chart of generating memory descriptors in accordance with an embodiment of the invention.

FIG. 7 shows a flow chart of one embodiment of the memory descriptor generation interface environment of the present invention. Initially, applications may issue sets of generic requests (Step 715) by making appropriate system calls (e.g., read, write, etc.) to the kernel that allow the underlying computer system memory association on the memory itself to be locked in place or captured exclusively for the generation of descriptors to the requested memory location. Next, the memory descriptor generation interface initiates the descriptor generation logic to construct descriptors to represent the address where the application wishes to access in memory (Step 720).

Subsequently, a token is generated by the kernel which is then passed to the appropriate access I/O (e.g., write or read) routine with the file system (Step 725). The file-system then fills the request from the set of memory descriptors that may be generated to handle the application's request (Step 730).

Next, the descriptor generation interface determines whether a descriptor that is being generated in response to a particular application request is derived or original (Step 735). If the prescribed descriptor for a particular application is derived, the descriptor generation interface creates an image of the corresponding original to the derived descriptor (Step 740) and copies the associating transformation data of the original descriptor (Step 745). The appropriate descriptor is generated in response to the requested application access to memory to the appropriate memory device (Step 750).

In one embodiment of the present invention, a stackable storage access mechanism (SSAM) provides an interface layer between the file system and a block storage device, such as a disc. The interface allows a more uniform interface to otherwise different devices and objects available within the system. Referring back to FIG. 3, file system (360) can make use of memory descriptors (e.g., memory descriptors 510, 520, 530 in FIG. 5) as abstractions of memory (330). This memory abstraction economizes the memory-dependent functions of file system (360), thus improving the efficiency of its operation. Further, the SSAM (377) allows file system (360) to abstract properties of device drivers (395), further improving its efficiency, because the SSAM (377) removes the need for the file system to "know" about properties (such as block size) of the devices.

Figure 8:
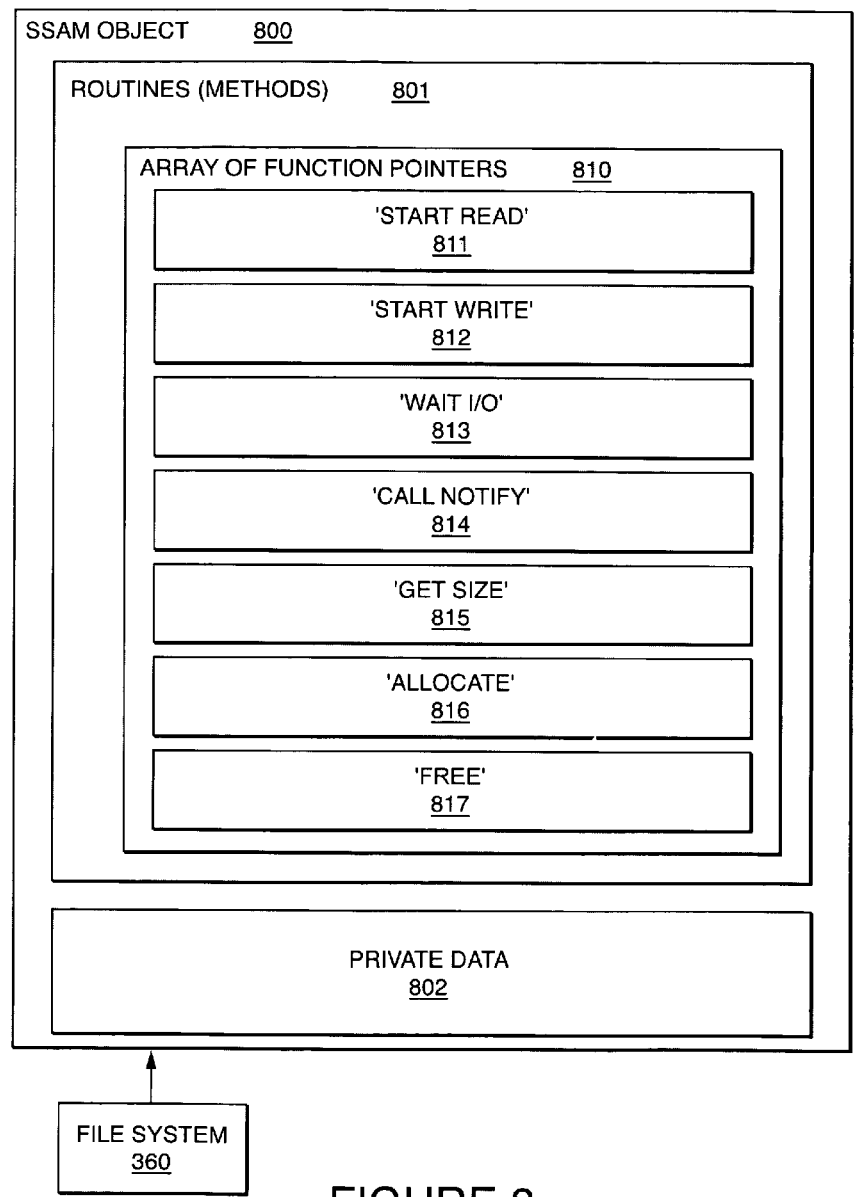
FIG. 8 shows a stackable storage access mechanism (SSAM) object in accordance with an embodiment of the invention.

File system (360) abstracts device drivers (395) using a pair of objects (or object-like code), such as a file based storage object (e.g., SSAM object (800) in FIG. 8) and an opaque cookie (e.g., IOC (910 in FIG. 9) to specify operations to be performed upon the devices (e.g., block storage (399) and I/O device (320)) controlled by drivers (395). Using these objects, the file system (360) imposes a structure, e.g., a uniform structure, onto storage and other driver-controlled devices. One embodiment of the present invention thus provides an abstract mechanism to transfer data between memory descriptors and the storage. These objects and their application are described in the following discussion.

FIG. 8 shows a SSAM object (800), according to one embodiment of the present invention. In one embodiment, the SSAM object (800) includes a file based object (e.g.; an object based in file system (360)), the function of which is performed by code including structures and arrays of function pointers. Such code may be rendered in a programming language, such as C. In another embodiment, the SSAM object (800) is coded in an object oriented language, such as C++.

The SSAM object (800) includes routines (e.g., methods) (801) and private data (802). Routines (801) include an array of function pointers (810), which specify various file based storage operations. Such pointers can include 'Start Read' (811), 'Start Write' (812), 'Wait IOC' (813), 'Notify' (814), 'Get Size' (815), 'Allocate' (816), and 'Free' (817).

Pointers 'Start Read' (811) and 'Start Write' (812) begin read and write to block (e.g., disc) operations, respectively. Pointer 'Wait IO' (813) allows synchronous operation by specifying that the file system "sleep" until a commenced read/write operation is complete. Pointer 'Notify' (814) allows asynchronous operation by invoking a 'notify' routine upon commencement of a read/write operation which notifies the file system (360) upon completion of that operation.

'Get Size' pointer (815) obtains the data size (length) specified by an I/O cookie (IOC) (e.g., IOC (900 in FIG. 9)). 'Allocate' pointer (816) and 'Free' pointer (817) allocate and free an IOC, respectively. Private data (802) includes data such as specifying a process that owns the particular 'uio' structure, the block size and maximum offset. The SSAM object (800) thus represents a structure including two pointers, one holding an operations vector and the other holding the private data. This configuration makes the SSAM (377 in FIG. 3) stackable as a layer between a file system (360) and a block device's drivers.

In one embodiment, the SSAM object (800) performs the function of a strategy routine for allowing a file system to interact with a block storage medium, such as a disc through a device driver. In another embodiment, the SSAM object (800) performs the function of a remote procedure call (RPC)

for allowing a file system (360) to interact with a remote computer or storage system, such as a database.

Figure 9:
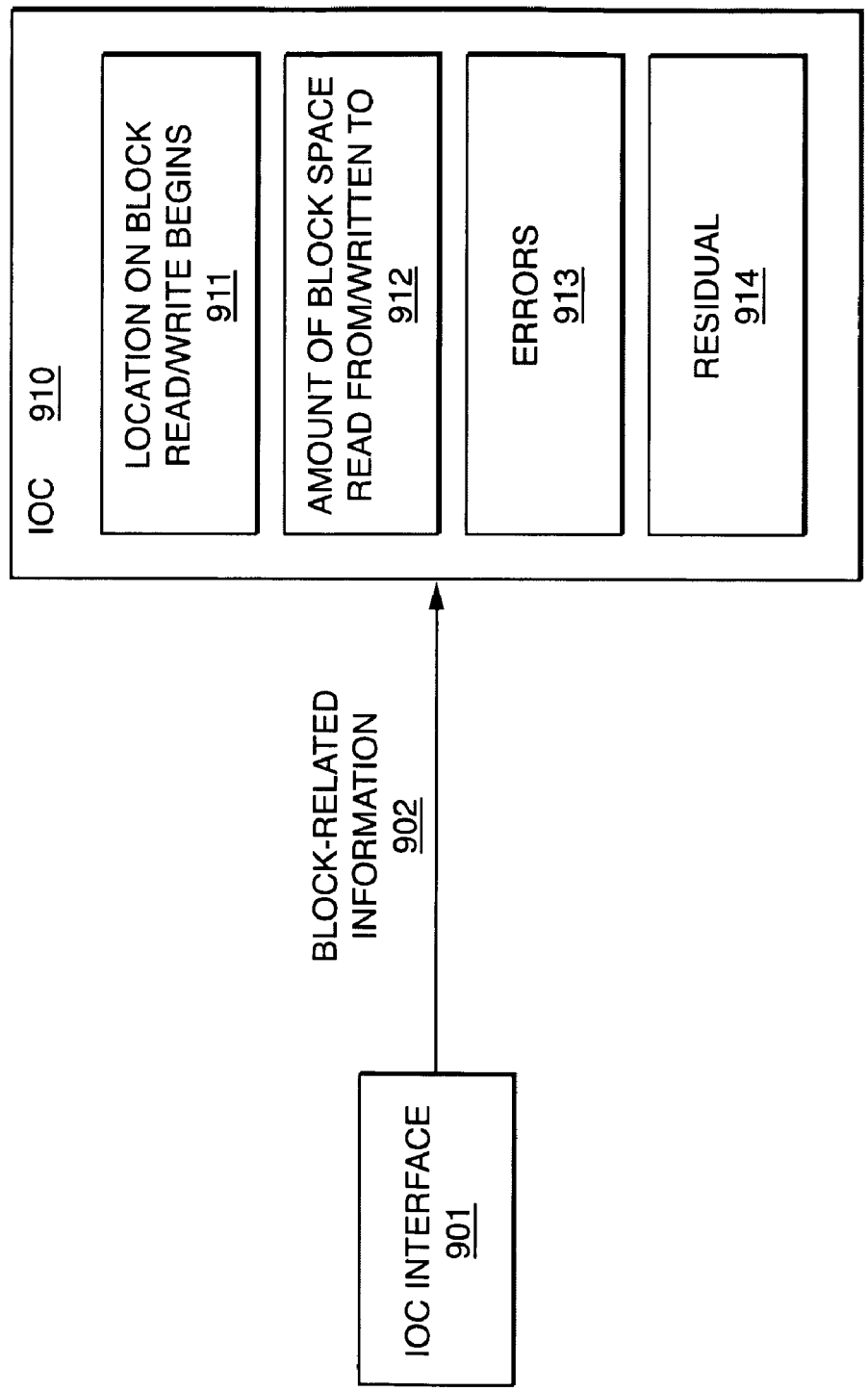
FIG. 9 shows an opaque cookie in accordance with an embodiment of the invention.

FIG. 9 shows a second SSAM object, which is an opaque I/O cookie (IOC) (910), according to one embodiment of the invention. Block-related information (902) is added to IOC (910) by an IOC interface (901). IOC (910) includes a location (e.g., offset) (911) on a block at which a read/write operation is to commence. IOC (910) also includes the amount (e.g., length) (912) of block space to be read from/written to. Detected errors (913) may be written to IOC (910), as may residual (914).

The SSAM interface can be described as a file based storage (FBS) interface. The FBS mechanism is intrinsically asynchronous, and associates the IOC (910) with each operation. The IOC (910) is allocated by the caller, however is opaque to the caller. The IOC (910) identifies the operation in specification, synchronization and results. FBS types and manifests may be described in one implementation as follows:

```
typedef struct fbs fbs_t;
typedef struct fbs_ops fbs_ops_t;
typedef struct ioc_result ioc_result_t;
struct fbs {
  fbs_ops_t *fbs_op;
  void *fbs data;
};
struct ioc_result {
  u_offset_t_io_offset;
  u_offset_t_io_length;
  u_offset_t_resid;
  int error;
};
```

The fbs_t is used by the file system code to transfer data to and from unstructured storage. An fbs_t is established by a type specific constructor function of the form:

```
int {TYPE}_to_fbs({TYPE SPECIFIC ARGS}, fbs_t *newfbs);
```

The caller is responsible for providing storage of the fos_t itself. The ioc_result contains the decoded results of a read or write operation. Fbs_ops_t is opaque to file systems.

FBS I/O functions can be described in one implementation as follows:

```
int fbs_start_read(fbs_t *fbs,
  void *ioc,
  fsivm_desc_t *mem,
  void (*notify)(void *ioc));
int fbs_start_write(fbs_t *fbs,
  void *ioc,
  fsivm_desc_t *mem,
  void (*notify)(void *ioc));
```

The parameters listed in the functions above are the following:
fbs: a valid fbs object
ioc: a unique area of storage for this operation
mem: a valid memory descriptor
notify: a function to indicate operation completion.

These routines start a transfer operation between the memory represented by mem and the location information stored in IOC. The IOC parameter is allocated by the caller, however it's type is opaque. The caller installs the IOC parameters using fbs_set_ioc and guarantees the IOC is large enough using fbs_ioc_size. These routines initiate the transfer and return as soon as possible, typically, but not necessarily before the I/O operation has completed. The completion of the operation is signified by invoking the provided notify routine with the IOC parameter provided initially. The IOC may not be recycled until the operation is complete. A return value described as follows:
RETURN VALUE
0 operation started successfully
EIO, EXIO operation could not start because of a device error condition int fbs_wait_ioc(fbs_t *fbs, void *ioc);
has the following parameters:
fbs: address of a valid fbs_t.
ioc: value associated with an io request.

In this operation, fbs_wait_ioc synchronizes with an io operation by suspending the caller until the operation is complete. After this returns, the function fbs_ioc_result may be applied to the ioc to inspect the status of the operation. If the operation was invoked with a non-NULL notify function, operation is invalid to call fbs_wait_ioc upon it. A return value described as follows:
RETURN VALUE
0 operation completed
EINVAL ioc invalid
int fbs_ioc_size(fbs_t *fbs)
has the following parameters:
fbs: a valid fbs_t.

In this operation, fbs_ioc_size provides the caller with information about how much space is required to perform an IO operation. This permits the caller to manage memory and associate private data with the operation, while keeping the format of this data valid.

A return value wherein the minimum return size is the size of (ioc_result_t) to permit the ioc to be recycled to interpret the results can be described as follows:
RETURN VALUE
>0 The minimum size of an ioc
<0 Error
int fbs_set_ioc(void *ioc, u_offset_t offset, u_offset_t len)
and has the following parameters:
ioc: memory to support io operation
offset: byte offset of transfer location
len: number of bytes to transfer In this operation, fbs_set_ioc sets the offset and length parameters inside ioc in a format opaque to the caller. A return value described as follows:
RETURN VALUE
0 successfully set
EINVAL Invalid parameter
int fbs_ioc_result(void *ioc, ioc_result_t *result)
has the following parameters:
ioc: an opaque region of memory at least as large as ioc_result_t
result: address to store result in In this operation, fbs_ioc_result decodes the result of an operation into an ioc_result. This permits the ioc to remain opaque to the caller. It is permissible for the "result" and the "ioc" to be the same address, as this function is only valid after an io operation has completed. A return value described as follows:
RETURN VALUE
0 operation successful.
EBUSY denotes an condition wherein an ioc operation has not completed.

Figure 10:
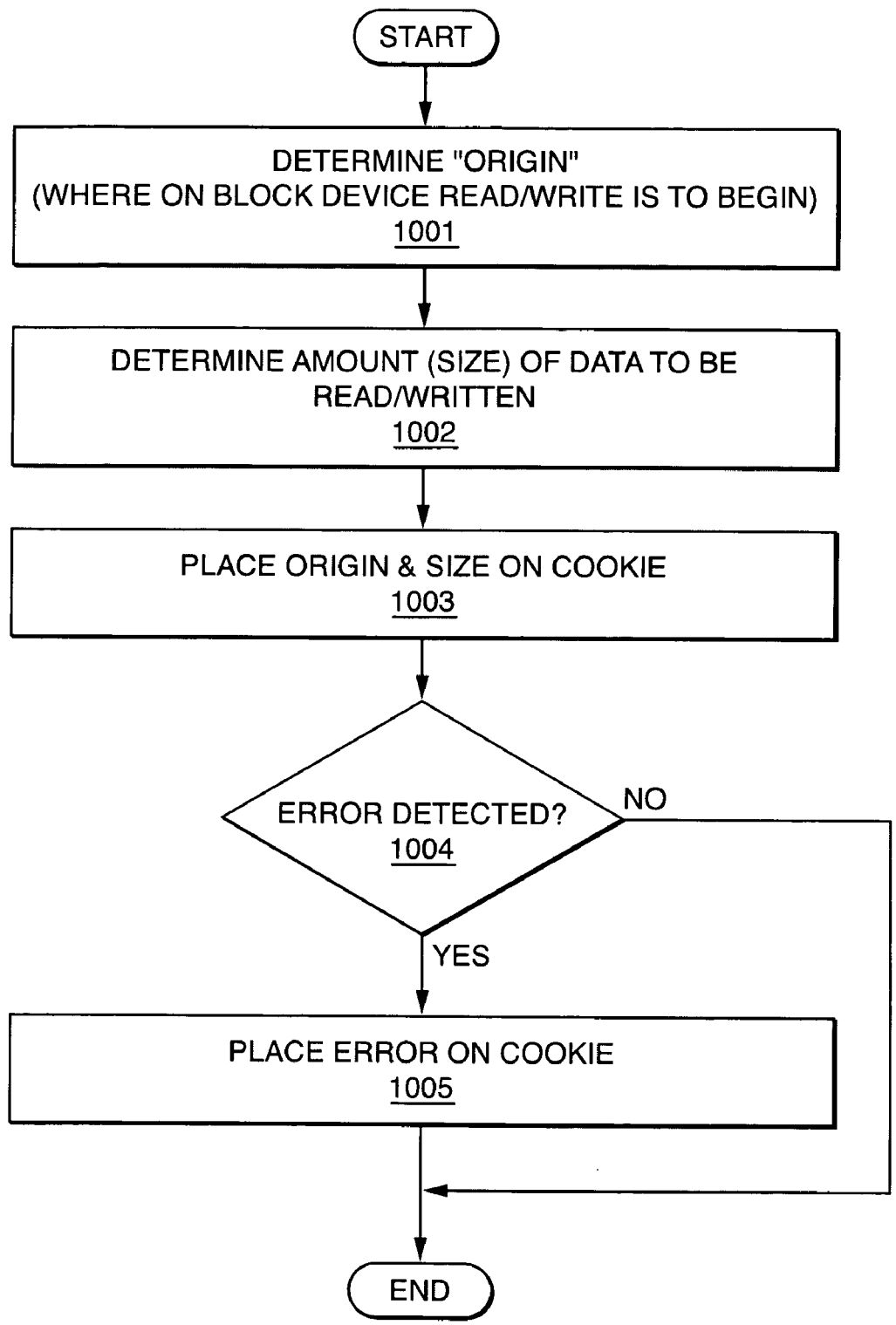
FIG. 10 shows a flow chart of a method for configuring an opaque cookie in accordance with an embodiment of the invention.

FIG. 10 shows a flow chart of a method for configuring an IOC (e.g., IOC 900 in FIG. 9), according to one embodiment of the present invention. Initially, an origin (e.g., the location on the block at which a read/write operation is to commence) is determined. (Step 1001). Next, the size (e.g., amount of data to be read/written) in block length is determined (Step 1002) and the origin and length is placed on the IOC by an IOC interface (e.g., IOC interface (901 in FIG. 9) (Step 1003). Subsequently, a determination is made whether an error has been detected (Step 1004). If not, the process is terminated. If an error is detected, then, the error is placed on the IOC (Step 1005) and the process is complete.

Figure 11:
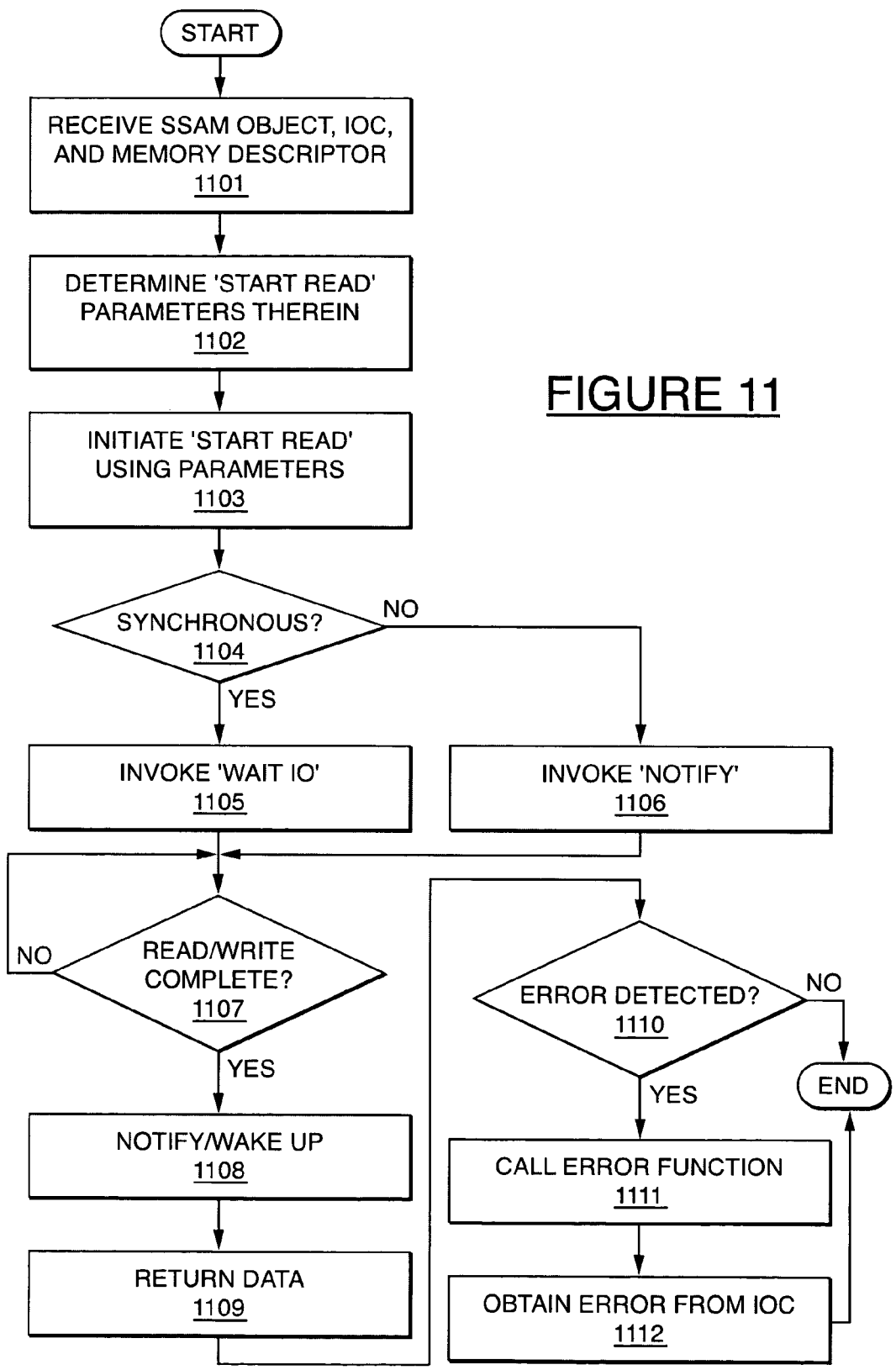
FIG. 11 shows a flow chart of a computer implemented method for a SSAM reading process in accordance with an embodiment of the invention.

FIG. 11 shows a flow chart of a method for a SSAM 'read' process, according to one embodiment of the present invention. One skilled in the art will appreciate that a 'write' process can be proceeded by an analogous 'write' process.

Figure 2:
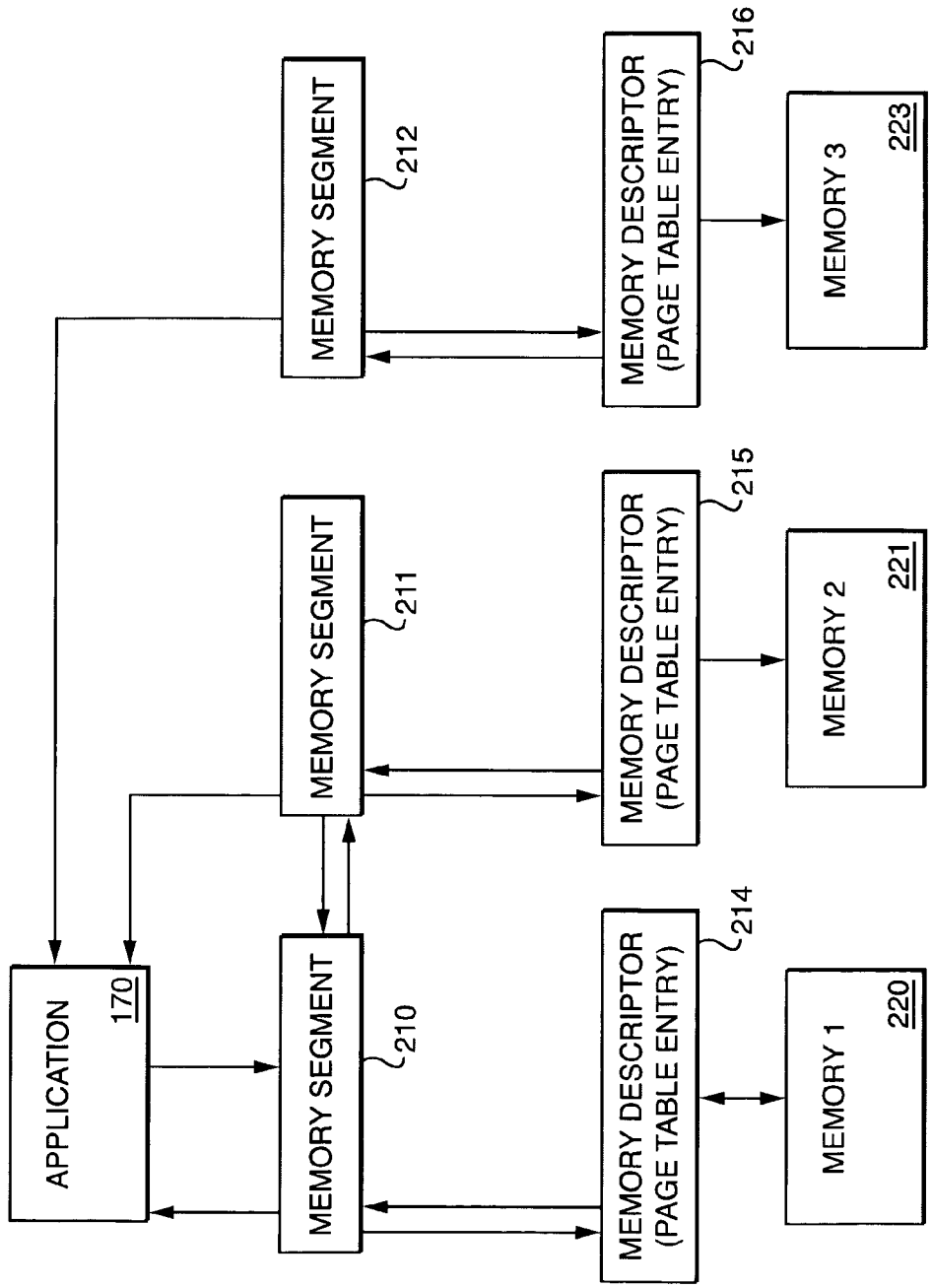
FIG. 2 shows a block diagram of a memory descriptor scheme of a distributed computer system.

Initially, an SSAM object (e.g., SSAM object (800 in FIG. 8)), an IOC (e.g., IOC (900 in FIG. 9) and a memory descriptor (e.g., memory descriptors (214, 215, 216 in FIG. 2) are received (Step 1101). Next, the parameters 'start read' within the SSAM object, the IOC, and the memory descriptor are determined (e.g., ascertained) (Step 1102) and the 'start read' operation is initiated using these parameters (Step 1103).

The SSAM process may be inherently asynchronous. However, a 'wait io' functionality (e.g., 'Wait IO' (813 in FIG. 8) may impart the capability for the SSAM described in FIG. 11 to operate synchronously. Next, a determination is made whether SSAM operation is to be synchronous (Step 1104). If the process is to proceed synchronously, then 'Wait IO' is invoked (Step 1105), whereupon the file system "sleeps" until the completion of the specified operation. If the process is to proceed asynchronously, then a 'notify' function is invoked (Step 1106). The 'notify' function will notify the file system upon completion of the specified operation allowing the file system to engage in other tasks while the specified operation takes place.

Next, a determination is made whether the specified operation (e.g., 'read') is complete (Step 1107). If not, the process loops back and waits to determine such completion. If the specified operation is done, then the file system is notified by the 'notify' routine (Step 1108). The 'notify' routine awakens a thread through a 'bio done' signal. If 'Wait IO' was invoked, the file system is awakened.

Subsequently, the data read from the block is returned for use (Step 1109), followed by a determination whether an error has been detected (Step 1110). If no error is detected, the process ends. If an error is detected, an error function is called (Step 1111) and obtains the error from the IOC (Step 1112), completing the process.

Figure 12:
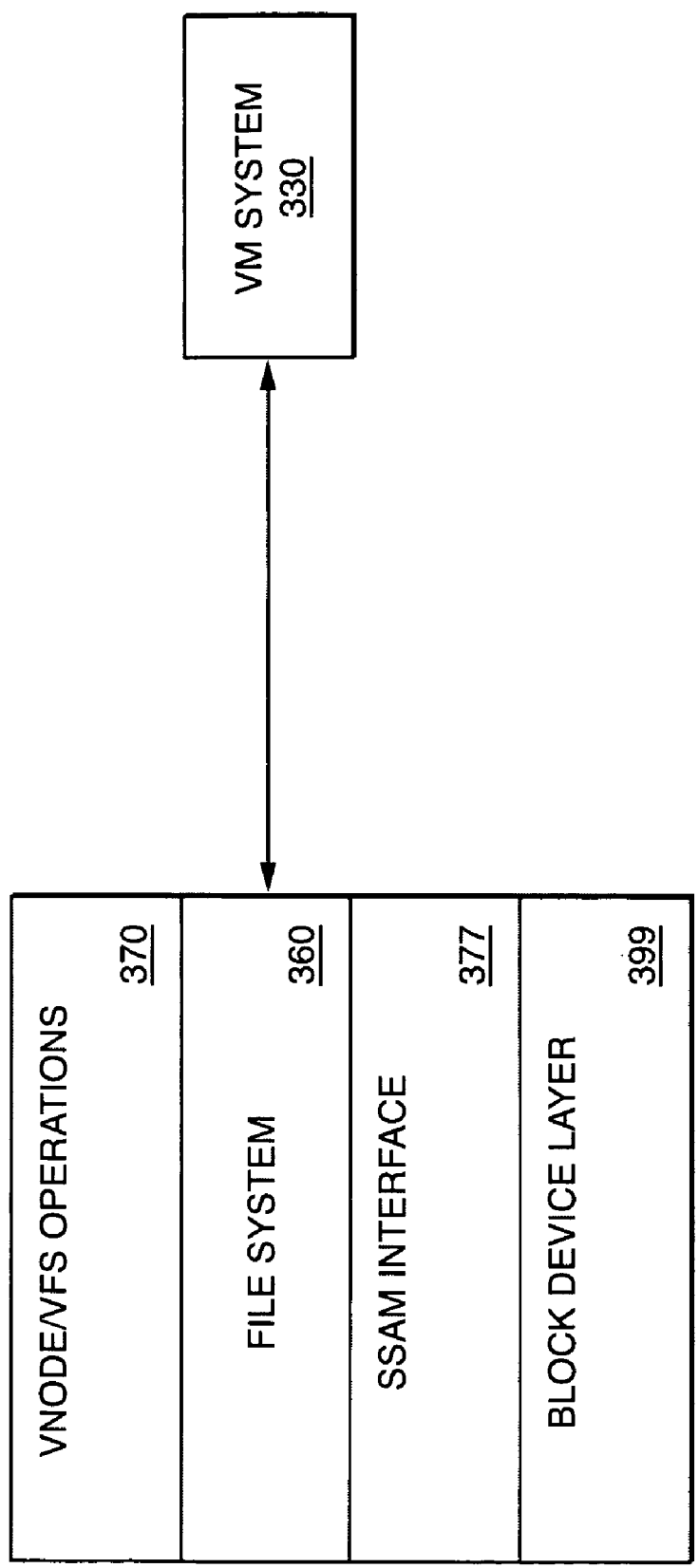
FIG. 12 shows a view of a SSAM interface in accordance with an embodiment of the present invention.

FIG. 12 shows a high level view of a SSAM (FBS) interface, showing the relationship between the SSAM and the file system, virtual memory system, and a block device layer, according to one embodiment of the present invention. File system (360) supports a Vnode/VFS operations layer (370). File system (360) interfaces with a memory system (330) using memory descriptors and drivers (e.g., descriptors (410, 411, 412, 413 in FIG. 4). The SSAM (377) acts as an interface between the file system (360) and the block device layer (399).

Conventionally, each and every memory type (as well as the driver types) in use must be ascertained and remembered by the file system to drive devices in a block device layer. Thus, to control an operation such as a read/write conventionally, a different command is required for each different memory type in use. For example, 'bread/bwrite' serves for a kernel buffer, 'directio_read/directio_write' serves for a user buffer, and 'pageio_read/pageio_write' serves for a page and page lists. Similar strategies are required for the differing device drivers. In contrast, in an embodiment of the present invention, the SSAM (377) provides abstraction of the memory system (330), the file system (360), and the block device layer (399). These abstractions provide a simple, efficient, and economical improvement over the conventional. For instance, instead of the three commands required conventionally, the abstraction provided by the present embodiment allows a single command format such as 'ssam_start_read/ssam_start_write' to control a read/write operation.

In summary, a SSAM for a file system provides for abstracting memory and devices away from the file system, so as to improve the operations of the file system. In one embodiment of the invention, a memory descriptor generation system generates a memory descriptor that manages a plurality of memory objects without having each of such objects independently generating a plurality of memory descriptors for each instantiation of applications that execute in the computer system. This obviates the need for the file system to "know" detailed information about the memory and thus improves the efficiency of the file system.

In one embodiment of the present invention, the SSAM provides an interface layer between the file system and a block storage device, such as a disc, using such abstractions of memory, as well as abstractions of the device itself. The SSAM layer allows the file system to abstract properties of device drivers, further increasing its efficiency, because it obviates the need for the file system to "know" about properties (such as block size) of the devices. These memory and device abstractions economize the memory-dependent and device driver dependent functions of the file system, thus improving the efficiency of its operation. Specifically, the present invention limits the number of descriptors representing a single application's access to memory, so errors in describing regions in main memory owned by a single device are reduced if not eliminated. Also, the amount of memory logic circuitry to design main memory is reduced leading to faster access to memory in the computer system.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer system, comprising:

a memory;

a file system for managing files;

a file system virtual memory interface for providing an interface between said memory and said file system, comprising a primary abstraction component comprising a memory descriptor and a plurality of sub-components supporting said primary abstraction component in said file system, wherein said memory descriptor abstracts said memory for said file system and comprises a pointer to a storage object, wherein the memory descriptor is used to initiate a data transfer from a memory identified by the memory descriptor to the storage object; and a file system stackable storage access mechanism (SSAM) layer for providing an interface between said file system and a physical storage device, wherein said SSAM layer has a first SSAM abstraction component and a second SSAM abstraction component, and wherein said SSAM layer abstracts said physical storage device for said file system, wherein said second SSAM abstraction component comprises an opaque cookie, wherein the opaque cookie comprises a block location and a size of a file stored on the physical storage device.

2. The computer system of claim 1, wherein said first SSAM abstraction component comprises a file based storage object.

3. The computer system of claim 2, wherein said file based storage object comprises a routine and private data.

4. The computer system of claim 3, wherein said routine comprises a plurality of methods and wherein said plurality of methods comprise an array of function pointers.

5. The computer system of claim 4, wherein said array of function pointers comprises 'Start Read'.

6. The computer system of claim 4, wherein said array of function pointers comprises 'Start Write'.

7. The computer system of claim 4, wherein said array of function pointers comprises 'Wait IO', and wherein said 'Wait IO' function pointer provides for synchronous operation of said file system.

8. The computer system of claim 4, wherein said array of function pointers comprises 'Call Notify', and wherein said 'Call Notify' function pointer calls a notify routine upon return of data and allows for asynchronous operation of said file system.

9. The computer system of claim 4, wherein said array of function pointers comprises at least one selected from the group consisting of 'Get Size', 'Allocate', and 'Free'.

10. The computer system of claim 1, wherein said first and said second SSAM objects comprise code written in an object oriented language.

11. The computer system of claim 1, wherein said SSAM interfaces with said physical storage device by calling a strategy routine.

12. The computer system of claim 1, wherein said physical storage device further comprises a remote computer, and wherein said SSAM interfaces with said remote computer by calling a remote procedure call.

13. A system comprising:
 a file system; and
 a file system virtual memory interface system comprising:
  a primary abstraction component comprising a memory descriptor, wherein the memory descriptor abstracts said memory for said file system and comprises a pointer to a storage object, wherein the memory descriptor is used to initiate a data transfer from a memory identified by the memory descriptor to the storage object,
  a file system stackable storage access mechanism (S SAM) layer for providing an interface between said file system, and
  a physical storage device to allow said file system to control,
  wherein said SSAM layer comprises a first SSAM abstraction component and a second SSAM abstraction component, wherein said second SSAM abstraction component comprises an opaque cookie, wherein the opaque cookie comprises a block location and a size of a file stored in the physical storage device, and
  wherein said first and said second SSAM abstraction components allow said SSAM layer to abstract said physical storage device for said file system.

14. The system of claim 13, wherein said first SSAM abstraction component comprises a file based storage object.

15. The system of claim 14, wherein said file base storage object comprises a routine and private data.

16. The system of claim 15, wherein said routine comprises a plurality of methods, wherein said plurality of methods comprise an array of function pointers.

17. The system of claim 16, wherein said array comprises a 'Wait IO' function pointer and wherein said 'Wait IO' function pointer provides for synchronous operation of said file system.

18. The system of claim 16, wherein said array comprises at least one selected from the group consisting of a 'Start Read' function pointer, a 'Start Write' function pointer, a 'Get Size' function pointer, an 'Allocate' function pointer, and a 'Free' function pointer.

19. The system of claim 16, wherein said array comprises a 'Call Notify' function pointer and wherein said 'Call Notify' function pointer calls a notify routine upon return of data and allows for asynchronous operation of said file system.

20. The system of claim 13, wherein said first and said second SSAM objects comprise code written in C.

21. The system of claim 13, wherein said first and said second SSAM objects comprise code written in an object oriented language.

22. The system of claim 13, said SSAM interfaces with said physical storage device by calling a strategy routine.

23. The system of claim 13, wherein said physical storage device comprises a remote computer and wherein said SSAM interfaces with said remote computer by calling a remote procedure call.

* * * * *